(12) United States Patent
Molyneux

(10) Patent No.: US 6,168,846 B1
(45) Date of Patent: Jan. 2, 2001

(54) LINER STRIP FOR PIPELINES OR TUNNELS

(75) Inventor: Syd Molyneux, Warana (AU)

(73) Assignee: Danby of North America, Cary, NC (US)

( * ) Notice: Under 35 U.S.C. 154(b), the term of this patent shall be extended for 0 days.

(21) Appl. No.: 09/131,548

(22) Filed: Aug. 10, 1998

(51) Int. Cl.[7] .................. B32B 3/02; E21D 11/06
(52) U.S. Cl. ............ 428/92; 428/298.1; 428/299.1; 428/299.7; 405/150.1; 405/151
(58) Field of Search .................. 428/85, 92, 298.1, 428/299.1, 299.7; 405/150.1, 151

(56) References Cited

U.S. PATENT DOCUMENTS

| | | | | |
|---|---|---|---|---|
| 4,179,539 | * | 12/1979 | Schweizer | 428/58 |
| 5,101,863 | * | 4/1992 | Fuji et al. | 405/150.1 |
| 5,145,281 | * | 9/1992 | Molyneux | 405/151 |
| 5,725,328 | * | 3/1998 | Schmager | 405/151 |

* cited by examiner

*Primary Examiner*—Elizabeth M. Cole
(74) *Attorney, Agent, or Firm*—Reed Smith Hazel & Thomas LLP

(57) ABSTRACT

A liner strip for lining an interior surface of a pipe including an extended plastic strip having T-shaped formations with reinforcing fibers integrally extruded in the liner strip for increasing the liner stiffness and tensile strength to resist forces imposed on the liner during installation.

8 Claims, 1 Drawing Sheet

LINER STRIP FOR PIPELINES OR TUNNELS

BACKGROUND OF THE INVENTION

1. Field of the Invention

The present invention relates generally to a liner strip for lining underground pipes such as pipelines, tunnels and structures. More particularly, the present invention relates to a liner strip particularly suitable for, but not limited to, renovating and/or protecting sewer pipes.

2. Description of the Prior Art

Sewer pipes often become obstructed or structurally deteriorated due to pipe corrosion by hydrogen sulfide, general degradation, organic growth, and root infiltration. As a result, the flow of sewage can become obstructed or the sewer pipe may collapse. A degraded sewer pipe, even if not obstructed, may allow ground water to infiltrate, thus unnecessarily increasing fluid flow to a treatment plant.

The cost associated with replacing sewer pipes can be prohibitively high, and disruption to above ground traffic may not be feasible. Therefore, sewer pipes are often relined rather than replaced. In order to minimize above ground disruption during sewer pipe relining, sewer pipes are often relined using technology that does not require digging a trench above the sewer pipe.

European Patent number 0450220, assigned to Danby Pty Ltd., discloses a method of renovating or protecting sewers or pipes which is effected using a liner strip and joiner strip spirally wound and locked together. This method, known as "PANEL LOK 3" was an improvement over the earlier "PANEL LOK 2" method of International Publication Number WO 88/05884, also assigned to Danby Pty Ltd. European patent publication 0475769 discloses a method of renovating and/or protecting oval or egg-shaped sewers and pipes known as "OVILOK."

While these methods have generally proven successful, it would be desirable to increase the liner stiffness and tensile strength to resist forces imposed on the liner during installation, e.g., group pressure and hydrostatic pressure, and forces imposed on the liner during its service life (e.g., earth pressure and hydrostatic pressure). This could be accomplished by either increasing the liner thickness or increasing the height of the flanges or T-shaped formations on the liner. However, merely increasing the thickness of the liner would not be acceptable since this would make the liner too costly to achieve significant increases in stiffness.

In addition, increasing the height of the flanges or T-shaped formations on the liner strip would not be acceptable as this would reduce the effective diameter of the lined pipe and/or sewer.

SUMMARY OF THE INVENTION

It is therefore an object of the present invention to provide a liner strip which has increased stiffness and tensile strength.

It is a further object to provide a liner strip which does not require a significant increase in the liner thickness or cost in order to achieve such increased stiffness and tensile strength.

Other preferred objects of the present invention will become apparent from the following description.

According to one broad aspect of the invention, there is provided a liner strip for lining an interior surface of a pipe of the type having a body and optional special flanges and/or T-shaped formations, the liner being formed of polyvinylchloride (PVC) or other plastics material, wherein reinforcing fibers or strands are extruded into and/or onto the body, flanges and/or T-formations.

In a preferred embodiment, the fibers or strands are aramid or KEVLAR® fibers (manufactured and sold by DuPont). Alternatively, the fibers or strands may be made of metal, e.g., stainless steel. The fibers or strands may be extruded into the liner strip and/or on the surfaces thereof.

It is believed that the fibers or strands will allow the liner strip to be formed (curved) to the desired installation shape with little extra applied force required.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
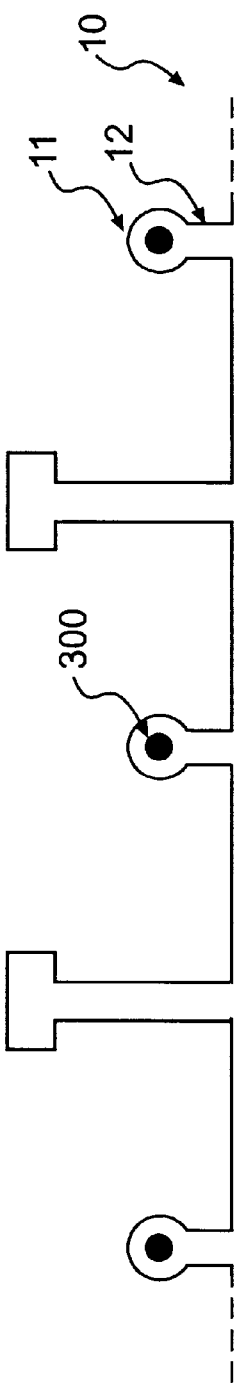
FIGS. 1 through 3 are respective sectional end views of alternative locations for the fibers or strands in the liner strips.

The invention will now be described in conjunction with the figures, wherein like reference characters indicate like elements throughout the several views.

Figure 2:
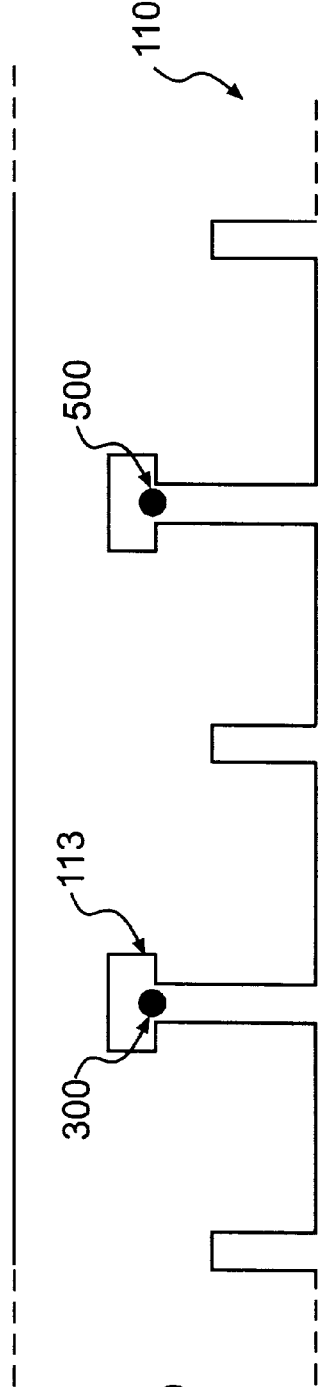
Figure 3:
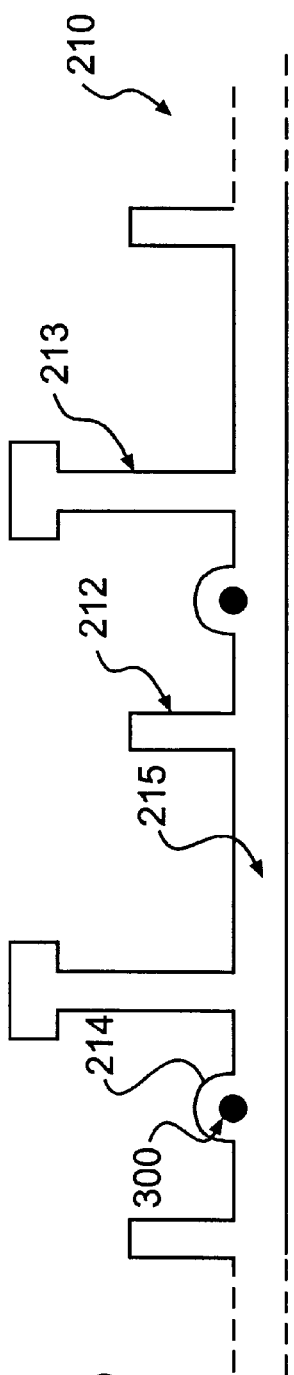

The liner strips 10, 110, 210 of FIGS. 1, 2 and 3 respectively are partial cross sections of extruded PVC liner strips having the edge formations described in European applications 450220 and 475769 and International publication WO 88/05884, incorporated herein in their entirety by reference.

In strip 10, KEVLAR® fibers 300 are extruded into bulbous formations 11 at the distal ends of spaced flanges 12.

In strip 110, the KEVLAR® fibers are extruded into the T-formations 113, while in strip 210, the fibers 300 are extruded into formations 214 in the body 215 between the flanges 212 and T-formations 213.

It will be readily apparent to one skilled in the art that the fibers or strands 300 can be provided in any one or more of the body, flanges and T-formations and that not all of, e.g., the flanges, will necessarily incorporate the fibers, e.g., only those near the center of the strip.

In an alternative embodiment, not shown, the fibers or strands 300 may be provided at regular or irregular spacings within the body 215 of the strip 210. As the side formations along the edges of the strip increase the tensile strength of the strip, the fibers or strands may be provided in increasing density (or closer spacing) towards the center line of the body.

The fibers or strands may be extruded on the surfaces of the body/flanges/T-formations and not be completely enclosed.

The fibers or strands 300 will also increase the tensile strength of the strip 10, 110 and 210.

While aramid fibers are preferred, stainless steel or a combination of steel and aramid fiber mixtures may be used. Other ductile materials with a modulus of elasticity and tensile strength larger (for example, in the order of 10x) than those of the host material (PVC) may also be used.

It is believed that the fibers 300, when group and/or external pressure is applied, will increase the resistance of the liner (formed from the strip 10, 110, 210) to collapse, wherein compressive stress upon the liner will result in the fibers being placed under tension.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A liner strip for lining an interior surface of a pipe comprising:

an extended strip of plastic material having a first planer surface intended to face inwardly of the pipe when formed into a lining;

said extended strip having a second planer surface intended to face the inner surface of the pipe and having integrally formed T-shaped formations extending perpendicular to said second planer surface in a direction toward the inner surface of said pipe when formed into a lining;

a plurality of spaced reinforcing fibers integrally extruded into said liner strip and extending along the length of said liner strip parallel to said T-shaped formation;

wherein said fibers are introduced into said extended strip while said extended strip is being extruded.

2. A liner strip according to claim 1 wherein said reinforcing fibers are integrally introduced into said T-shaped formations so that said fibers are introduced into said T-shaped formations while said T-shaped formations are extruded.

3. A liner strip according to claim 1 further comprising second formations integrally extruded with said strip between said T-shaped formations and extending perpendicular to said second planer surface for a distance less than said T-shaped formations, wherein said second formations are extruded while said extended strip is being extruded.

4. A liner strip according to claim 3 wherein said reinforcing fibers are integrally introduced into said second formations so that said fibers are introduced into said second formations while said second formations are extruded.

5. A liner strip according to claim 2 wherein said reinforcing fibers are aramid fibers.

6. A liner strip according to claim 4 wherein said reinforcing fibers are aramid fibers.

7. A liner strip according to claim 2 wherein said reinforcing fibers are strands of stainless steel.

8. A liner according to claim 4 wherein said reinforcing fibers are strands of stainless steel.

* * * * *